(12) United States Patent
Norden et al.

(10) Patent No.: US 10,953,326 B2
(45) Date of Patent: Mar. 23, 2021

(54) METHOD AND APPARATUS

(71) Applicant: KING.COM LIMITED, St. Julians (MT)

(72) Inventors: Klas Norden, Stockholm (SE); Daniel Nystrand, Stockholm (SE)

(73) Assignee: KING.COM LTD., St. Julians (MT)

( * ) Notice: Subject to any disclaimer, the term of this patent is extended or adjusted under 35 U.S.C. 154(b) by 0 days.

(21) Appl. No.: 15/951,371

(22) Filed: Apr. 12, 2018

(65) Prior Publication Data
US 2018/0229119 A1 Aug. 16, 2018

Related U.S. Application Data

(63) Continuation of application No. 14/676,237, filed on Apr. 1, 2015, now Pat. No. 9,956,485.

(51) Int. Cl.
A63F 13/00 (2014.01)
A63F 13/426 (2014.01)
A63F 13/57 (2014.01)

(52) U.S. Cl.
CPC ............ A63F 13/426 (2014.09); A63F 13/57 (2014.09); A63F 2300/66 (2013.01)

(58) Field of Classification Search
None
See application file for complete search history.

(56) References Cited

PUBLICATIONS

Taito America Corporation, Bust-A-Move instruction Booklet for Super Nintendo Entertainment System, 1995, Nintendo of Amercia, pp. 1-15, from GameDatabase.org, 2 pages, Link below http://www.gamesdatabase.org/Media/System/Nintendo_SNES/manual/Formated/Bust-A-Move_-_1995_-_Taito_Corporation.pdf.*
Bust-A-Move Game Sample—SNES/SFC, Apr. 17, 2010, Screen Shot, 1 page, video length 6:18. <<https://www.youtube.com/watch?v=hjjcth_b5NQ>>.*
Dubble-Bubbleshooter for iPhone, iPad, iPod Touch and Mac OS X, Published Jul. 12, 2010, 1 Page. (https://www.youtube.com/watch?v=a3QvECCBkkg) (Year: 2010).*
Top 10 Bubble Games for iPhone / iPad / iPod Touch, Publishged Sep. 27, 2012, 1 Page. (https://www.youtube.com/watch?v=m_KSkt1fjh4) (Year: 2012).*
Bubble Shooter—free bubble puzzle game (iPhone/iPad, Android, Kindle Fire), Feb. 1, 2012, 15 pages (https://www.youtube.com/watch?v=tVkcVaK5F8U) (Year: 2012).*
Bubble Shooter, Jun. 10, 2009, 3 pages <<https://www.youtube.com/watch?v=MrG4IoFuArU>> (Year: 2009).*

* cited by examiner

Primary Examiner — Jay Trent Liddle
Assistant Examiner — Alex F. R. P. Rada, III
(74) Attorney, Agent, or Firm — Saul Ewing Arnstein & Lehr LLP

(57) ABSTRACT

There is provided a computer implemented method of providing a game in a device, the method comprising retrieving, from at least one memory of the device, information associated with a plurality of objects and one or more characteristics of the objects, the information comprising at least one constraint, each constraint being between two of the plurality of objects, determining, using at least one processor of the device, position information for each of the plurality of objects in dependence on an imposed movement generated by the at least one processor and a threshold distance which limits the distance between respective ones of said plurality of objects having a constraint therebetween.

31 Claims, 15 Drawing Sheets

METHOD AND APPARATUS

CROSS-REFERENCE TO RELATED APPLICATIONS

This application is a continuation of U.S. application Ser. No. 14/676,237, filed on Apr. 1, 2015, the entire contents of which being fully incorporated herein by reference.

FIELD OF THE INVENTION

Some embodiments may have particular, but not exclusive application in the field of computer implemented applications including for example games, in an online or offline environment, and computing devices therefor.

BACKGROUND OF THE INVENTION

There exist many types of computer device where the display is controlled by an input. In some embodiments the input may be a cursor or pointer that is controlled by a human interface device such as a mouse, joystick, keyboard etc. Additionally or alternatively the display may comprise a touchscreen which can be controlled by a user's touch. That is, activation of functions and objects is responsive to user input made by way of the user touching a particular object displayed on the screen, and thereby selecting that object. That touch may be by a user's finger or a cursor or pointer.

There are many technical challenges and technical considerations facing the designer of computer applications such as games executed on a user or computer or other device having a user interface, such as designing algorithms for controlling the game mechanic.

One particular context is that of a computer game where a game board or area is displayed to a user which has adjacent game objects having at least one characteristic, in an arrangement. In one game, the mechanic of the game is that a user should aim a game object at the arrangement of game objects such that it joins the arrangement of game objects to form a sequence of three or more game objects having matching characteristics.

SUMMARY OF THE INVENTION

In a first aspect there is provided a computer implemented method of providing a game in a device, the method comprising retrieving, from at least one memory of the device, information associated with a plurality of objects and one or more characteristics of the objects, the information comprising at least one association, each association being between two of the plurality of objects, determining, using at least one processor of the device, position information for each of the plurality of objects in dependence on an imposed movement generated by the at least one processor and a threshold distance which limits the distance between respective ones of said plurality of objects having an association therebetween, the threshold distance stored in the at least one memory and causing the objects with the one or more characteristics to be displayed on an area of a display in dependence on the position information if a current distance between respective objects having an association is less than the threshold distance and removing a stored association between two of said objects if the current distance between them exceeds the threshold distance.

The method may comprise determining, using at least one processor, the current distance in dependence on a weight of the association.

The method may comprise determining, using at least one processor, weight in dependence on the number of associated objects of a respective object and at least one characteristic of the associated objects.

The method may comprise determining the current distance in dependence the number of associations of a respective object.

The imposed motion generated by the processor may be a wave motion.

The imposed motion generated by the processor may include a gravity component.

The method may comprise determining, using a least one processor, a display characteristic for the plurality of objects in dependence on the current distance.

The method may comprise causing, using at least one processor, information associated with an object to be stored in at least one memory, which object is to be added to the plurality of objects, determining, using at least one processor, position information for each of the plurality of objects in dependence on the imposed movement generated by the processor, the threshold distance, and a movement component generated by the processor in dependence on information associated with the object added to the plurality of objects, storing, in at least one memory, an association between the added object and at least one of the plurality of objects if the current distance between them is less than the threshold, removing a stored association between a respective objects if the current distance between them exceeds the threshold, and causing the objects with the one or more characteristics to be displayed on an area of a display in dependence on the position information if a current distance between respective objects having an association is less than the threshold distance.

The method may comprise determining, using at least one processor, after causing the objects with the one or more characteristics to be displayed on an area of a display in dependence on the position information, if a matching condition between the added object and associated second objects is satisfied and causing, using at least one processor, objects satisfying the matching condition to be removed from the display area, determining, using a processor, second position information for the plurality of objects caused to be displayed on the display area, in dependence on the imposed movement generated by the processor and the threshold distance which limits the distance a first object of the plurality of objects is positioned from an associated second object of the plurality of objects, the threshold distance stored in the at least one memory and storing, in at least one memory, an association between respective objects if the current distance between them is less than the threshold distance.

In a second apparatus there is provided an apparatus, said apparatus comprising at least one processor and at least one memory, said at least one processor and said at least one memory configured to retrieve from at least one memory of the device, information associated with a plurality of objects and one or more characteristics of the objects, the information comprising at least one association, each association being between two of the plurality of objects, determine, using at least one processor of the device, position information for each of the plurality of objects in dependence on an imposed movement generated by the at least one processor and a threshold distance which limits the distance between respective ones of said plurality of objects having an association therebetween, the threshold distance stored in the at least one memory and cause the objects with the one or more characteristics to be displayed on an area of a display in dependence on the position information if a current distance between respective objects having an association is less than the threshold distance and remove a stored association between two of said objects if the current distance between them exceeds the threshold distance.

The apparatus may be configured to determine, using at least one processor, the current distance in dependence on a weight of the association.

The apparatus may be configured to determine, using at least one processor, weight in dependence on the number of associated objects of a respective object and at least one characteristic of the associated objects.

The apparatus may be configured to determine the current distance in dependence the number of associations of a respective object.

The imposed motion generated by the processor may be a wave motion.

The imposed motion generated by the processor may include a gravity component.

The apparatus may be configured to determine, using a least one processor, a display characteristic for the plurality of objects in dependence on the current distance.

The apparatus may be configured to cause, using at least one processor, information associated with an object to be stored in at least one memory, which object is to be added to the plurality of objects, determine, using at least one processor, position information for each of the plurality of objects in dependence on the imposed movement generated by the processor, the threshold distance, and a movement component generated by the processor in dependence on information associated with the object added to the plurality of objects, store, in at least one memory, an association between the added object and at least one of the plurality of objects if the current distance between them is less than the threshold, remove a stored association between a respective objects if the current distance between them exceeds the threshold, and cause the objects with the one or more characteristics to be displayed on an area of a display in dependence on the position information if a current distance between respective objects having an association is less than the threshold distance.

The apparatus may be configured to determine, using at least one processor, after causing the objects with the one or more characteristics to be displayed on an area of a display in dependence on the position information, if a matching condition between the added object and associated second objects is satisfied, cause, using at least one processor, objects satisfying the matching condition to be removed from the display area, determine, using a processor, second position information for the plurality of objects caused to be displayed on the display area, in dependence on the imposed movement generated by the processor and the threshold distance which limits the distance a first object of the plurality of objects is positioned from an associated second object of the plurality of objects, the threshold distance stored in the at least one memory and store, in at least one memory, an association between respective objects if the current distance between them is less than the threshold distance.

In a third aspect there is provided a computer readable storage device storing instructions that, when processed by at least one processor of a device, causes said processor to retrieve from at least one memory of the device, information associated with a plurality of objects and one or more characteristics of the objects, the information comprising at least one association, each association being between two of the plurality of objects, determine, using at least one processor of the device, position information for each of the plurality of objects in dependence on an imposed movement generated by the at least one processor and a threshold distance which limits the distance between respective ones of said plurality of objects having an association therebetween, the threshold distance stored in the at least one memory and cause the objects with the one or more characteristics to be displayed on an area of a display in dependence on the position information if a current distance between respective objects having an association is less than the threshold distance and remove a stored association between two of said objects if the current distance between them exceeds the threshold distance.

In a fourth aspect there is provided a computer readable storage device storing instructions that, when processed by at least one processor of a device, causes said processor to perform the method of the first aspect.

BRIEF DESCRIPTION OF DRAWINGS

To understand some embodiments, reference will now be made by way of example only to the accompanying drawings, in which.

DETAILED DESCRIPTION OF SOME EMBODIMENTS

The techniques described herein can be implemented in for instance a computer application which involves the matching of objects displayed on a game area or game board and the elimination of such to complete a level or aim or target score of such a game. The game may be a so-called "casual" or "social" game, wherein short periods of play are undertaken by the user whenever appropriate according to the user's schedule.

Such games are increasingly offered and played by users on a wide range of devices such as portable devices such as smart pad or tables or larger devices such as desk top computers or lap top computers.

Figure 1:
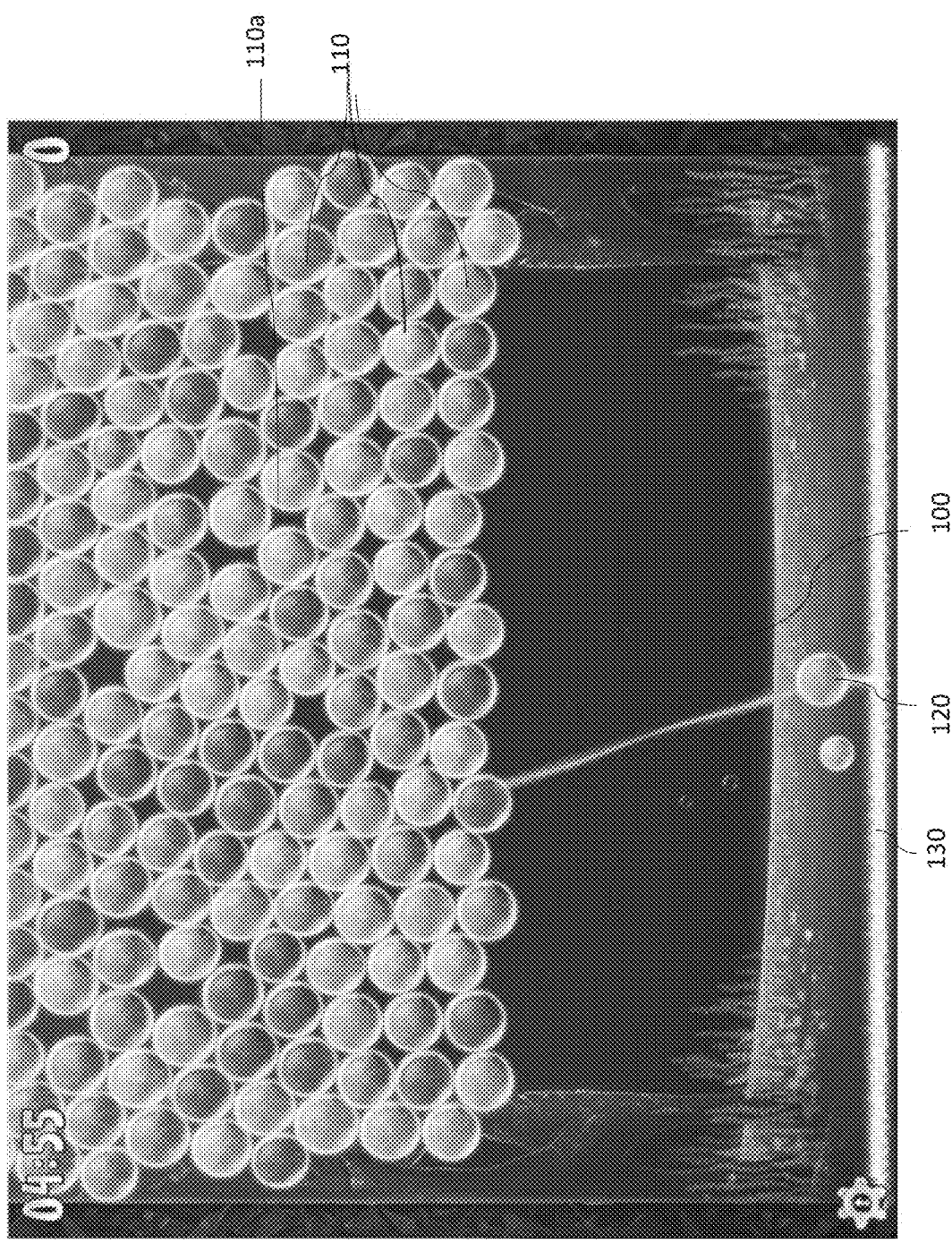
FIG. 1 shows an example embodiment of a game board.

Reference is made to FIG. 1 which shows an example game board of a "bubble shooter" type computer game. The game has a game area 100 upon which are disposed game objects 110. The game objects 110 in this embodiment comprise entities which may have at least one characteristic associated therewith. The characteristics may be one or more of color, diameter and/or shape per object or entity 110. In this embodiment, the objects 110 are bubble like entities arranged in an approximately hexagonal grid like fashion, although in other embodiments other game board configurations and other game object shapes or entities and arrangements may be utilized.

In such an embodiment the game objects on the game board have three, five or eight nearest or adjacent neighbouring game objects. Other game board layouts or configurations may be provided which have differing numbers of nearest or adjacent game objects. For example, triangular, pyramidal, rectangular octagonal or other layouts comprising position spaces or tiles within the game board 100 may be provided for display.

There is also provided a player object 120 which may be a projectile for shooting at the game objects depending on the game. This may be a game object as well. A target indicator 130 is provided which may be moved by the player to target game objects 110 with player object or projectile 120.

Typically the game area 100 will also depict game indicators such as a score 160, a time played 170 and lives and/or turns left in the form of indicator bar 180.

There may also be provided on the display control or optional actionable items such as shuffle control, and a game reset or off control, music and sound or volume control.

In such games, the object may be to clear the game area 100 of game objects 110 by shooting the player object 120 at a game objects 110. If a characteristic of the player object 120 matches a characteristic of the game object 110 to which the player object is targeted then the game object 110 and player object 120 may be removed from the game area. In some embodiments, there may be a requirement for the player object to match three or more adjacent game objects for the game objects to be eliminated.

When a sequence of three or more adjacent objects with the same characteristic is formed, then the game objects forming that sequence may be automatically removed from the screen and game objects adjacent to the removed game objects may move/change arrangement. The display area may scroll through the game area to display further game objects in the arrangement.

In some embodiments, the game may be implemented so that a level or a game session is completed when a certain target is reached by the user.

The target may comprise achieving a certain point score by targeting the player object 120 to make a sequence of three or more adjacent game objects that have the same characteristic, each sequence scoring a particular score depending on the number of game objects in the sequence.

The target may alternatively be to remove one or more specific game objects, reach a certain number of points etc. As game objects 110 are removed from the game area 100, the display scrolls through the game area to display more game objects in the arrangement. The target may be to remove a game object in the top row of the arrangement such that a continuous row of game objects is no longer formed.

Game objects which are no longer attached to the arrangement may form scoring objects. The scoring objects may be associated with a particular points value which may be used to determine a total point score.

Figure 2:
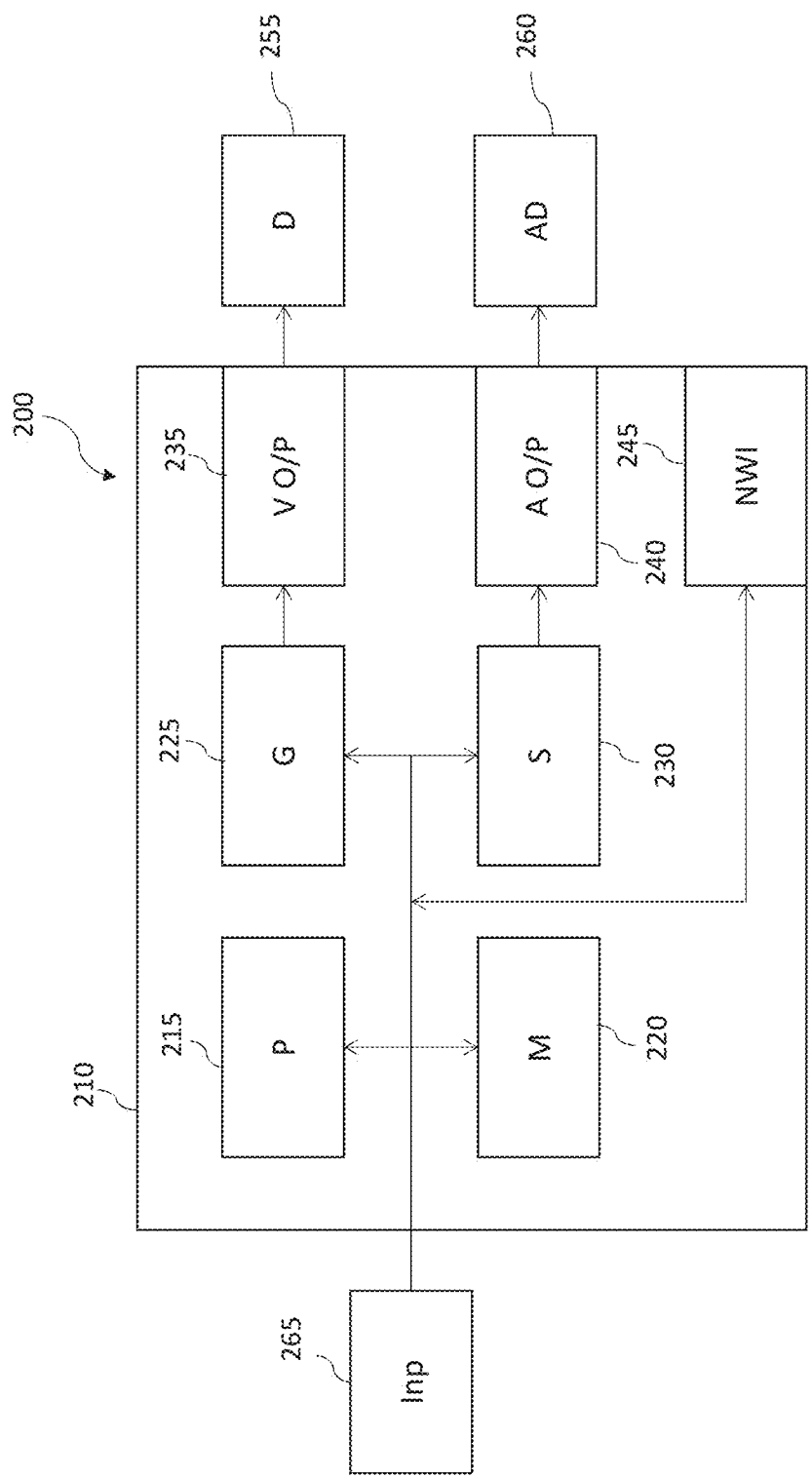
FIG. 2 shows an example user device in which some embodiments may be provided.

A schematic view of a user or computing device 200 according to an embodiment is shown in FIG. 2. All of the blocks shown are implemented by suitable circuitry. The blocks may be implemented in hardware and/or software. The user device may have a control part 210. The control part 210 has one or more processors 215 and one or more memories 220. The control part 210 is also shown as having a graphics controller 225 and a sound controller 230. It should be appreciated that one or other or both of the graphics controller 225 and sound controller 230 may be provided by the one or more processors 215.

The graphics controller 225 is configured to provide a video output 235. The sound controller 230 is configured to provide an audio output 240. The controller 210 has an interface 245 allowing the device to be able to communicate with a network such as the Internet or other communication infrastructure.

The video output 235 is provided to a display 255. The audio output 240 is provided to an audio device 260 such as a speaker and/or earphone(s).

The device 200 has an input device 265. The input device 265 can take any suitable format and can be one or more of a keyboard, mouse, touch screen, joystick or game controller. It should be appreciated that the display 255 may in some embodiments also provide the input device 265 by way of an integrated touch screen for example.

The blocks of the controller 210 are configured to communicate with each other via an interconnect such as a bus or any other suitable interconnect and/or by point to point communication.

It should be appreciated that in some embodiments, the controller 210 may be implemented by one or more integrated circuits, at least in part.

The user device 200 is shown by way of example only. In alternative embodiments, one or more of the parts may be omitted. Alternatively or additionally, some embodiments may comprise one or more other parts. Alternatively or additionally, one or more parts may be combined.

Figure 3:
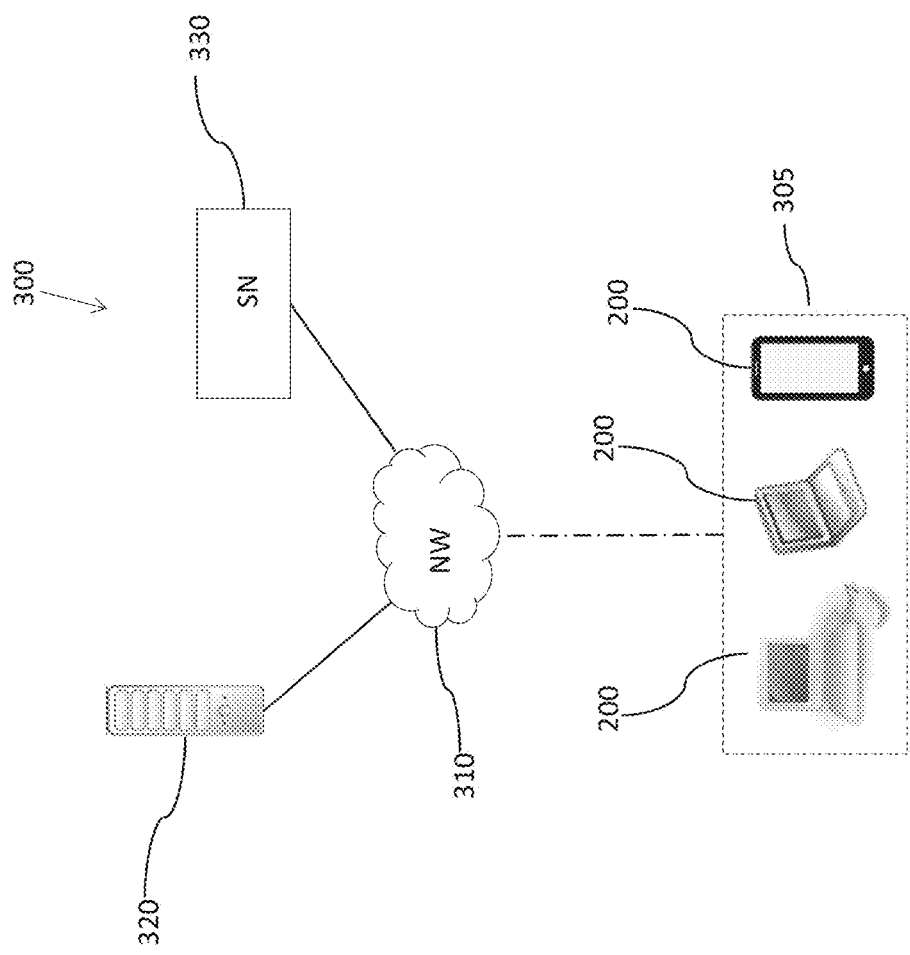
FIG. 3 shows an example system in which some embodiments may be provided.

FIG. 3 schematically shows a system 300 in some embodiments. The system 300 comprises a server 320 which may store databases of game players' details, profiles, high scores and so on. In practice, one or more databases may be provided. Where more than one server is provided, the database(s) may be provided in one database or across two or more servers 320. The server 320 may also have a games data function. This may comprise a memory to store the computer game program and a processor to run the games program.

The server may communicate via for instance the internet 310 to one or more user devices 305 and may further provide connections to a social network 330 such as Facebook™.

It should be appreciated that embodiments may be deployed in different system architectures. For example, the computer game may be implemented as a computer game that is stored in the memory 220 of the user device 200 and is run on the processor 215 of the user device 200. However, the server 320 may handle some elements of the game in some embodiments. By way of example only, a Java game applet may be provided to the user device 200 and the locally running Java applet will generate, for example, the graphics, sounds, and user interaction for the game play on the user device 200. Some data may be fed back to the server 320 to allow interaction with other user devices 305. The data which is fed back may also allow scoring and/or cross platform synchronization.

In some embodiments, the game may be implemented as a computer program that is stored in a memory of the system, for example the server 320, and which runs on a processor of the game server. Data streams or updates are supplied to the user device 200 to allow the user device 200 to render and display graphics and sounds in a browser of the user device 200. Such an approach is sometimes referred to as a web services approach. It should be appreciated, however, that such an approach does not necessarily require the use of the Internet.

Figure 4:
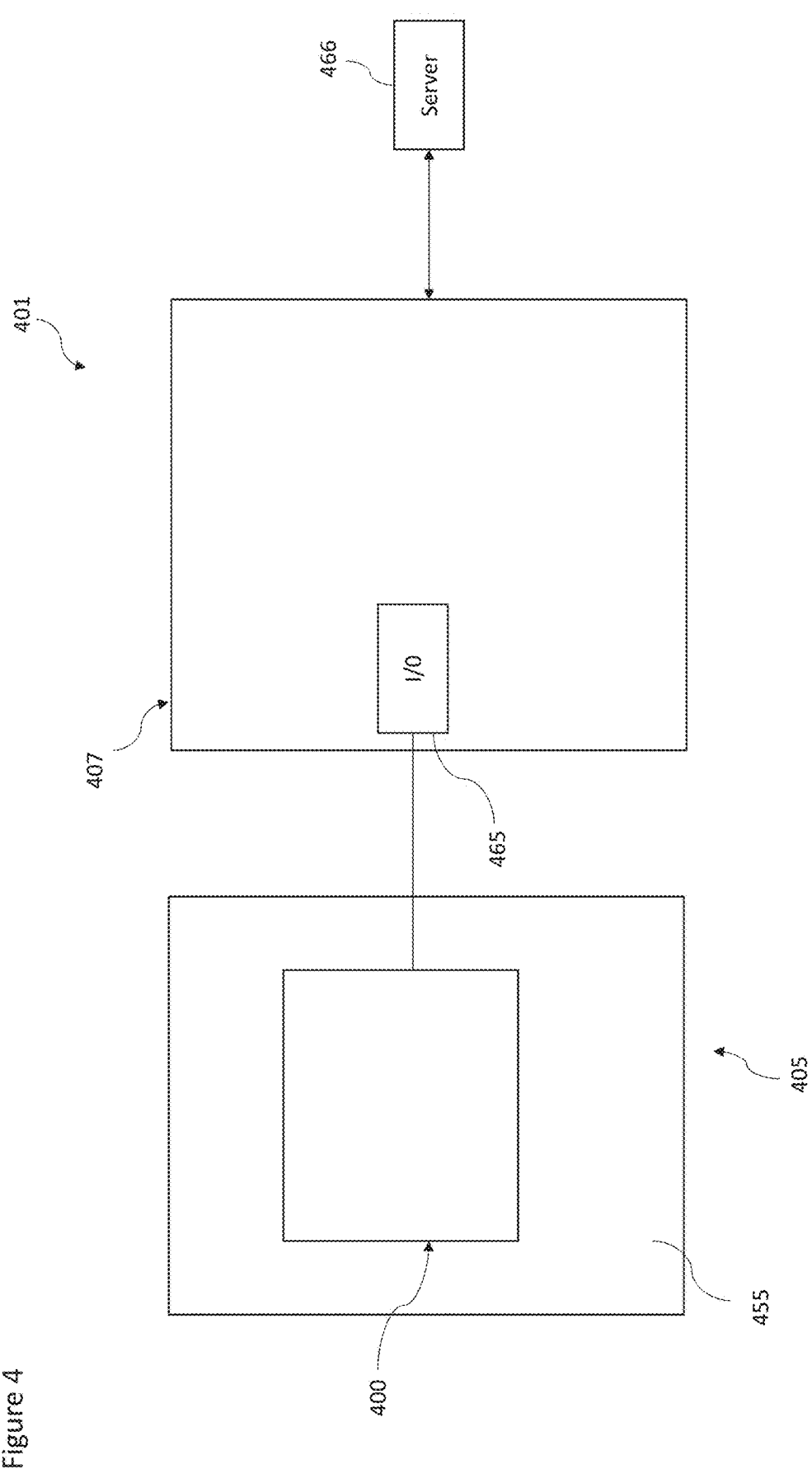
FIG. 4 shows an example system in which some embodiments may be provided.

FIG. 4 is a schematic diagram showing a system 401 according to an embodiment. It will be understood that this diagram is simplified for the purposes of explanation, and that embodiments may be implemented in other ways. The system described with respect to FIG. 4 may operate in conjunction with the functional blocks described with respect to FIG. 5 and the user device may comprise one or more of the parts shown in FIG. 2.

The system comprises a display 455 on a device 405. The display 455 is configured to display a game board 400. The device may be any suitable device such as a mobile phone, tablet, PC, laptop etc. The display 405 may be a touch screen display. Additionally or alternatively a user can navigate the display in another manner, such as by controlling a cursor with a mouse (in which case the display might not necessarily be touch screen).

A processing block is schematically shown at 407. The processing block may comprise one or more memories and one or more processors, for example as described with respect to FIG. 2. The processing block is communicatively connected to the display 405 via In-Out (I/O) interface 465.

The processing block 407 is in communication with server 466, such as a game server.

Although shown in a separated manner for the purposes of explanation, the elements shown within the processing block 407 in FIG. 4 can be contained within or distributed between the device 405 and the server 466 in any way.

Figure 5:
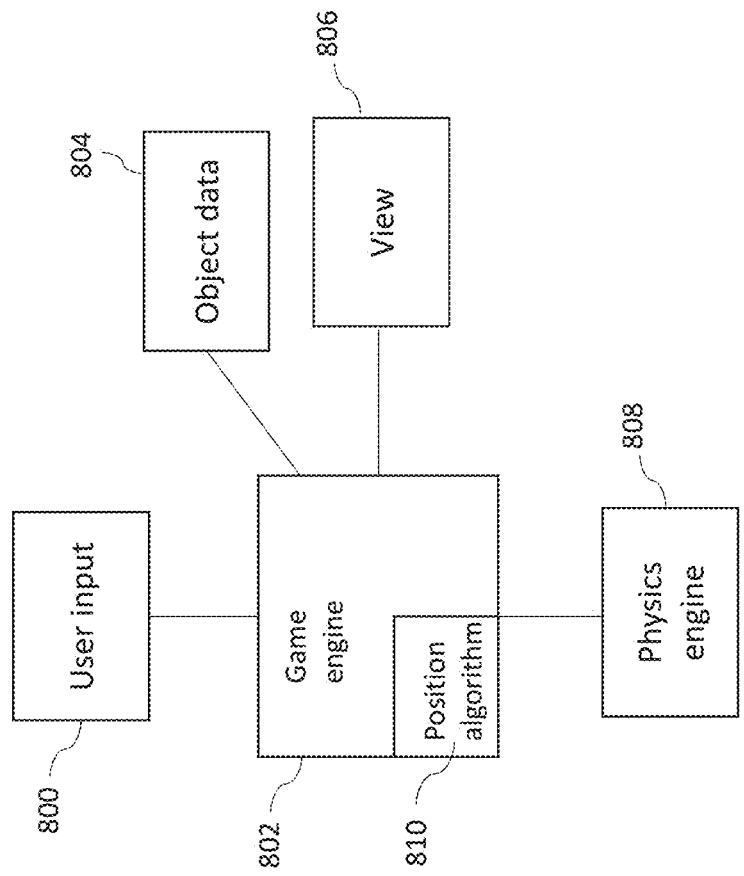
FIG. 5 schematically shows the functional blocks of an embodiment.

Reference is made to FIG. 5 which schematically shows the functional blocks of an embodiment, which may enable such game play. A user input block 800 is shown. This captures the user input and feeds the input to a game engine 802. In the context of the game of some embodiments, this user input may be which the releasing of the player object and in which direction. This user input can be via any suitable user interface, such as discussed earlier.

The game engine 802 will process the information provided by the user input. The game engine 802 (for example a game model) will determine if a valid combination has been made.

Each object has object data associated therewith. The object data 804 may be stored in any suitable memory location. In some embodiments, the object data may be considered to be part of the game engine and in other embodiments may be considered to be outside the game engine. The object data may provide information as to the properties of an object. These properties can include attribute information such as colour and/or whether or not an object has a particular function such as a so-called booster function. The object data may include the position data, that is, information representing the position of the object in the displayed image.

In some embodiments, the game engine will check if the game object satisfies the rule or rules for a valid match. The rule or rules define whether or not a match condition has been satisfied. The match condition will be dependent on the game. In some embodiments, a match condition will be satisfied if the game objects are arranged to provide a sequence of at least three adjacent first objects sharing at least one same characteristic. In some embodiments, the game objects of the sequence are removed.

Thus, the game engine will be in control of the matching mechanism. The game engine will have access to data for each object including its position and the at least one characteristic associated with the object, and will be able to determine if a match condition has been met. If a match condition is met, the objects in the match may be removed from the game area.

A physics engine 808 is provided which is configured to control the movement of moving objects on the display, for example the game objects in the arrangement or the player object. A player object may be a game object which is displayed moving along a determined target path. The physics engine may manage the movement of an object based on, for example, gravity which controls the falling of the object, a wave mechanism, collision detection, when the falling object hits another object and optionally rotation calculations when the falling object rolls, for example, down the side of the other objects. The physics engine may manage the movement of an object in dependence on a determined target path.

The movement of the object is thus controlled by the physics engine, which will control the movement of objects in the game area.

The physics engine 808 may be part of the game engine 802 or separate therefrom. In some embodiments, the physics engine function may be provided by a physics engine in conjunction with another function, separate to the physics engine. That separate function may be a separate physics engine, part of the game engine or provided by one or more processors.

A position control block 810 is provided. In the embodiment shown, this position control block may be part of the game engine. In other embodiments, this position control block may be outside the game engine. The position control block may be provided by a position algorithm in some embodiments.

A view function 806 uses the object data to provide the displayed image with which the user is able to view and/or interact.

Figure 6:
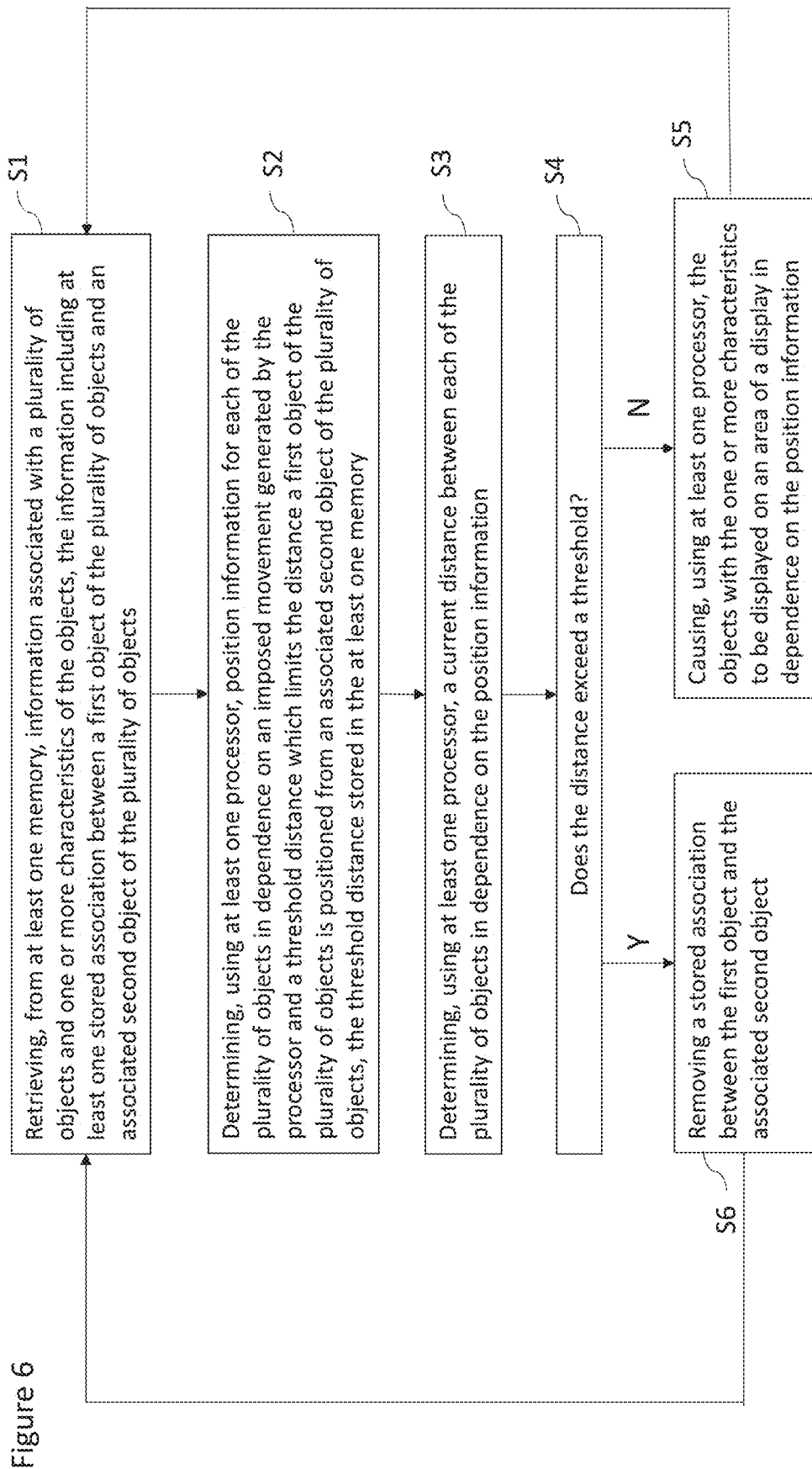
FIG. 6 shows a flowchart according to an embodiment.

Embodiments will now be described with reference to FIGS. 6 to 8. FIG. 6 is a flowchart of a method according to some embodiments.

A first step S1 of the method comprises retrieving, from at least one memory, information associated with a plurality of objects and one or more characteristics of the objects, the information including at least one stored association between a first object of the plurality of objects and an associated second object of the plurality of objects.

A second step S2 of the method comprises determining, using at least one processor, position information for each of the plurality of objects in dependence on an imposed movement generated by the processor and a threshold distance which limits the distance a first object of the plurality of objects is positioned from an associated second object of the plurality of objects, the threshold distance stored in the at least one memory.

A third step S3 of the method comprises determining, using at least one processor, a current distance between each of the plurality of objects in dependence on the position information.

If it is determined in step S4 that the current distance does not exceed the threshold distance then the method comprises in step 56 causing, using at least one processor, the objects with the one or more characteristics to be displayed on an area of a display in dependence on the position information. The method will return to step S1.

If it is determined in step S4 that the current distance does exceed the threshold distance the method comprises in step S6 removing a stored association between a first object and the second object from at least one memory. The method will return to step S1.

Figure 7:
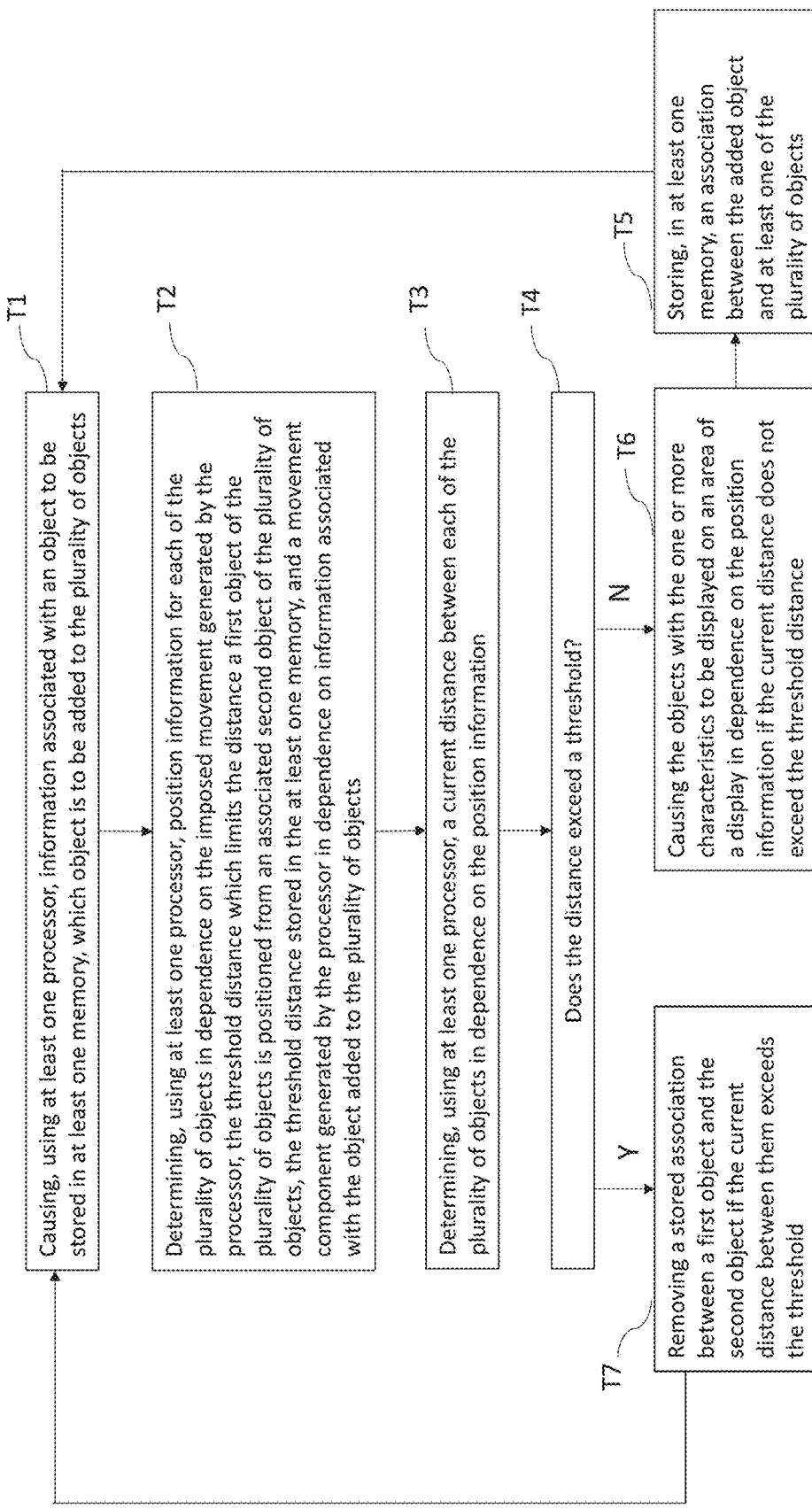
FIG. 7 shows a flowchart according to an embodiment.

In addition, or alternatively, the method may comprise steps such as those shown in the flowchart of FIG. 7. As described in relation to FIG. 1, a game may comprise firing a projectile object towards an arrangement of game objects. The projectile object may appear to cause a change in the arrangement of game objects displayed in the game area.

In a first step T1, the method comprises causing, using at least one processor, information associated with an object to be stored in at least one memory, which object is to be added to the plurality of objects. This may be in response to user input or in response to a consequence of a previous user input or an output of the game engine. The object to be added may be for example, the game object which is fired at the other game object. The information may be associated with characteristics of said object to be added In a second step T2, the method comprises determining, using at least one processor, position information for each of the plurality of objects in dependence on the imposed movement generated by the processor, the threshold distance which limits the distance a first object of the plurality of objects is positioned from an associated second object of the plurality of objects, the threshold distance stored in the at least one memory, and a movement component generated by the processor in dependence on the information associated with the object being added to the plurality of objects.

In a third step T3, the method comprises determining, using at least one processor, a current distance between each of the plurality of objects in dependence on the position information.

If it is determined in step T4 that the current distance exceeds the threshold distance, the method comprises in step T5 storing, in at least one memory, an association between the added object and at least one of the plurality of objects. The method will return to step T1.

If it is determined in step T4, that the current distance does not exceed the threshold distance, the method comprises in step T6 causing the objects with the one or more characteristics to be displayed on an area of a display in dependence on the position information. The method will return to step T1.

If it is determined in step T4 the current distance exceeds the threshold distance, the method comprises in step T7 removing a stored association between a first object and the associated second object if the current distance between them exceeds the threshold distance. The method will return to step T1.

Figure 8:
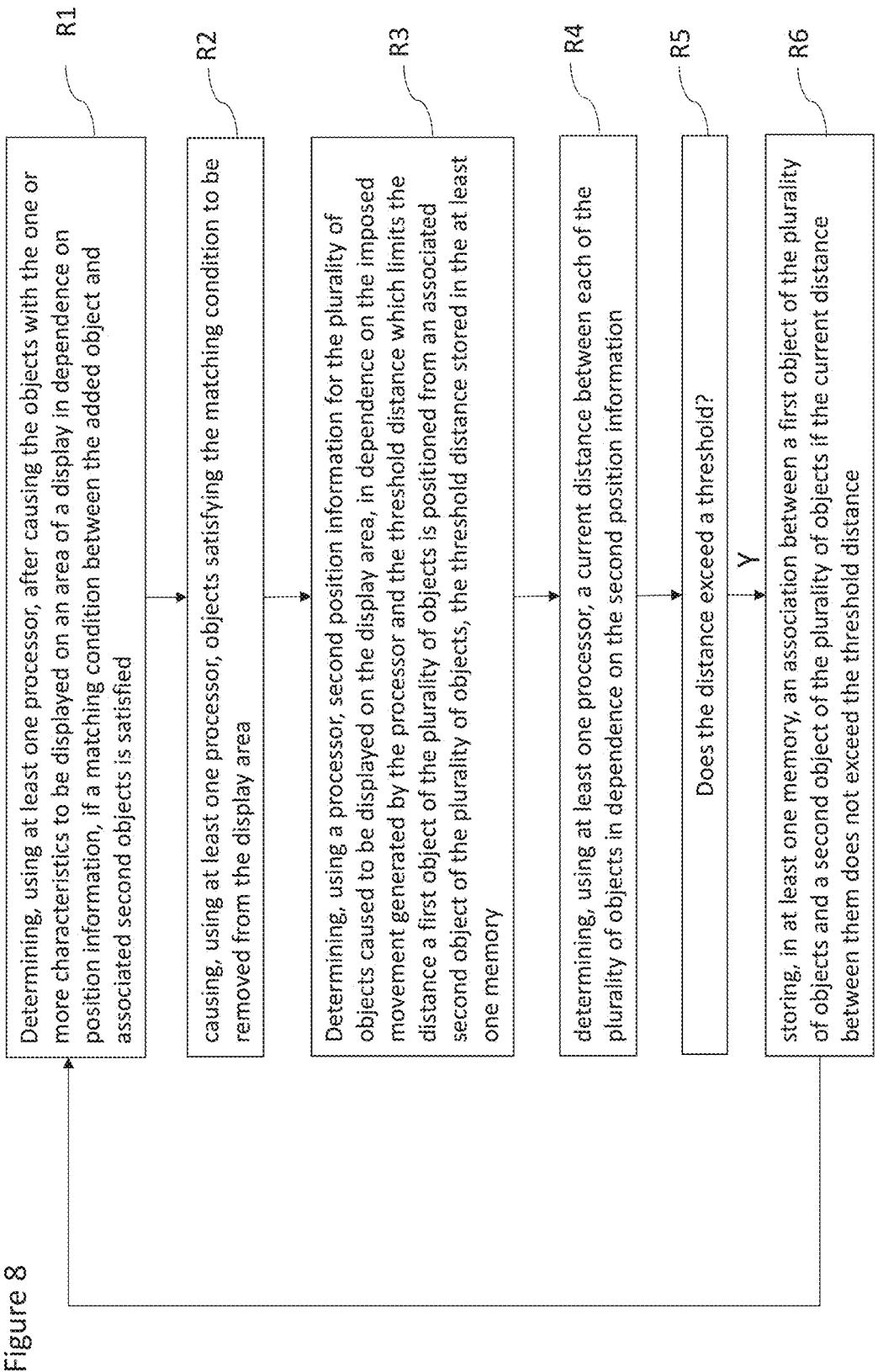
FIG. 8 shows a flowchart according to an embodiment.

Additionally or alternatively, the method may comprise steps such as those shown in the flowchart of FIG. 8. As described with reference to FIG. 1, an aim of a game may be to create sequences of adjacent objects having matching characteristics. To determine if a match condition has been satisfied, a processor, for example, a processor forming part of a game engine may determine whether a match condition has been satisfied. This determination may be made after the change in the arrangement of game objects has been completed. Once objects satisfying he match condition have been removed, the arrangement of game objects may appear to change again.

In a first step R1, the method comprises determining, using at least one processor, after causing the objects with the one or more characteristics to be displayed on an area of a display in dependence on the position information, if a matching condition between the added object and associated second objects is satisfied.

If it is determined in step R1 that a matching condition is satisfied, the method comprises causing in step R2, using at least one processor, objects satisfying the matching condition to be removed from the display area.

In a third step R3, the method comprises determining, using a processor, second position information for the plurality of objects caused to be displayed on the display area, in dependence on the imposed movement generated by the processor and the threshold distance which limits the distance a first object of the plurality of objects is positioned from an associated second object of the plurality of objects, the threshold distance stored in the at least one memory.

In a fourth step R4, the method comprises determining, using at least one processor, a current distance between each of the plurality of objects in dependence on the second position information.

If it is determined in step R5, that the current distance between a first object of the plurality of objects and a second object of the plurality of objects does not exceed the threshold distance the method comprises in step R6 storing, in at least one memory, an association between the first object of the plurality of objects and the second object of the plurality of objects. The method will return to step T1.

The steps shown in the flowcharts of FIGS. 7 and 8 may be performed in combination with, for example subsequent to, the steps shown in FIG. 6.

A method such as that of FIGS. 6, 7 and 8 may be a computer implemented method of providing a game. The method may be implemented by at least one processor and at least one memory of a device. Different ones of the steps may be implemented by the same processor(s) and/or different processors. The method may be implemented by a physics engine to control movement of objects displayed in the game area. The physics engine may comprise the at least one processor, the at least one memory, or any combination thereof. Although the steps are shown in a first order, the steps may be performed in any order, and/or may be performed as part of a single calculation/determination.

The stored association may comprise a constraint. A constraint may be vector having a first end associated with the first object and a second end associated with the at least one second object, the constraint having a rest length and a current length, the current length determined in dependence on the position of the first end of the constraint and the position of the second end of the constraint. The constraints associated with an object may be stored in the memory.

Figure 9:
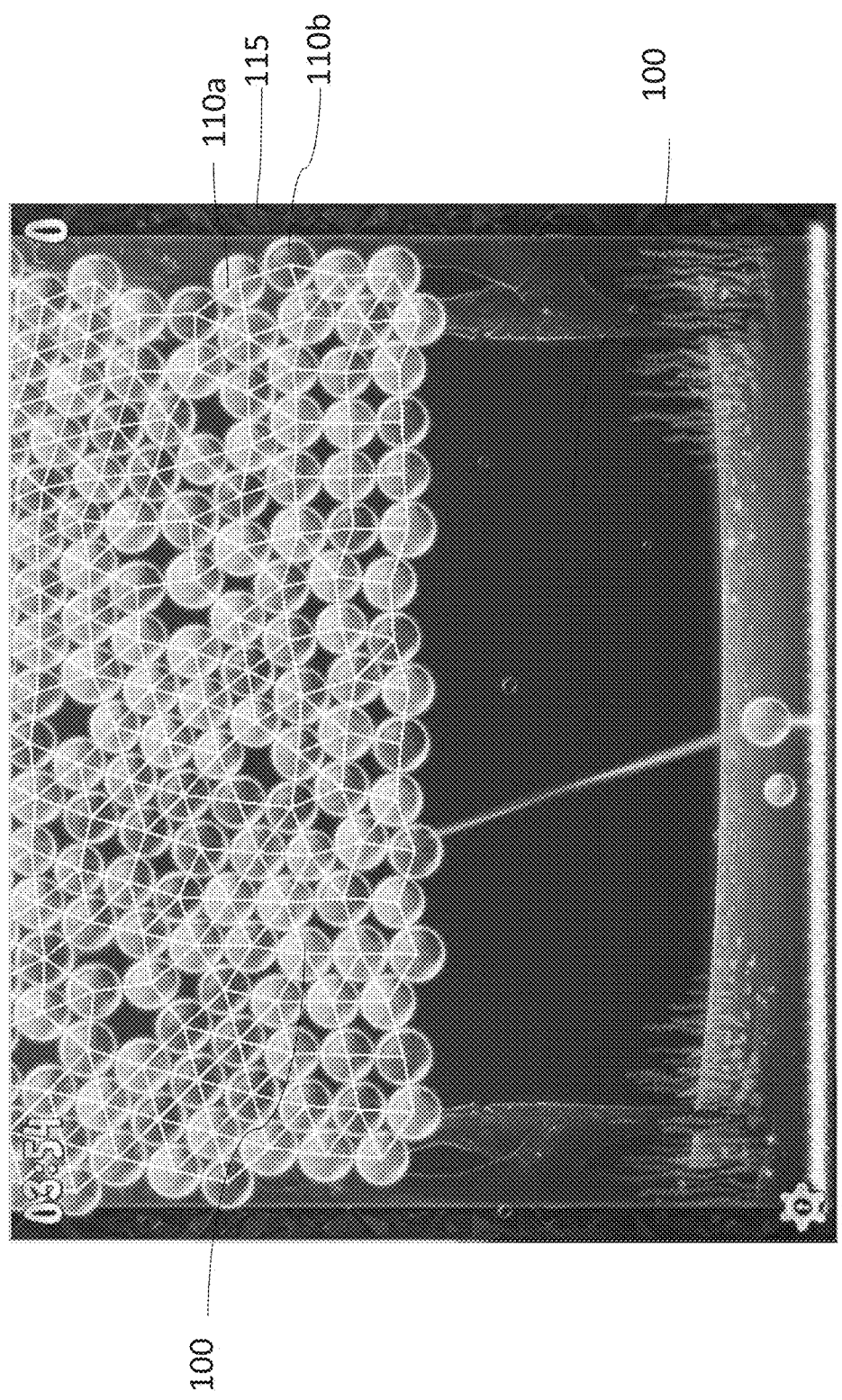
FIG. 9 shows an example embodiment of a game board.

FIG. 9 shows a game area 100 such as that of FIG. 1, with a representation of the associations or constraints 115 between respective objects 110a and 110b superimposed on the arrangement of game objects 101. The plurality of constraints 115 may form a network of constraints, or a mesh and may be used to determine the arrangement in which the objects are displayed.

The method may comprise determining, using at least one processor, the current distance in dependence on the number of associations which are stored in connection. The more associations an object has with associated objects, the more constrained its movement is. The current length may also be determined based on the weight of the associated objects. The weight of the association may be determined, by a processor, in dependence on at least one of the number of associated objects, the effect of a gravity component and at least one characteristic of the associated objects. The characteristic may be size or shape of the associated objects. The higher the weight, the further the current length.

The imposed motion generated by the processor may be a wave motion. That is the imposed motion may appear on the display as of a wave were moving through the plurality of objects, e.g. an arrangement of game objects. Other types of imposed motion may be used in different embodiments.

The imposed motion generated by the processor may include a gravity component. That is, the movement may be generated such that gravity appears to act in a particular area of a display.

The method may comprise determining, using a least one processor, a display characteristic, e.g. size and/or shape, for the plurality of objects in dependence on the current distance.

The plurality of objects may comprise game objects and player objects object as described with reference to FIG. 1. The added object may have a first target path which may be determined by the processor. The match condition may be as described with reference to FIG. 1.

Figure 10:
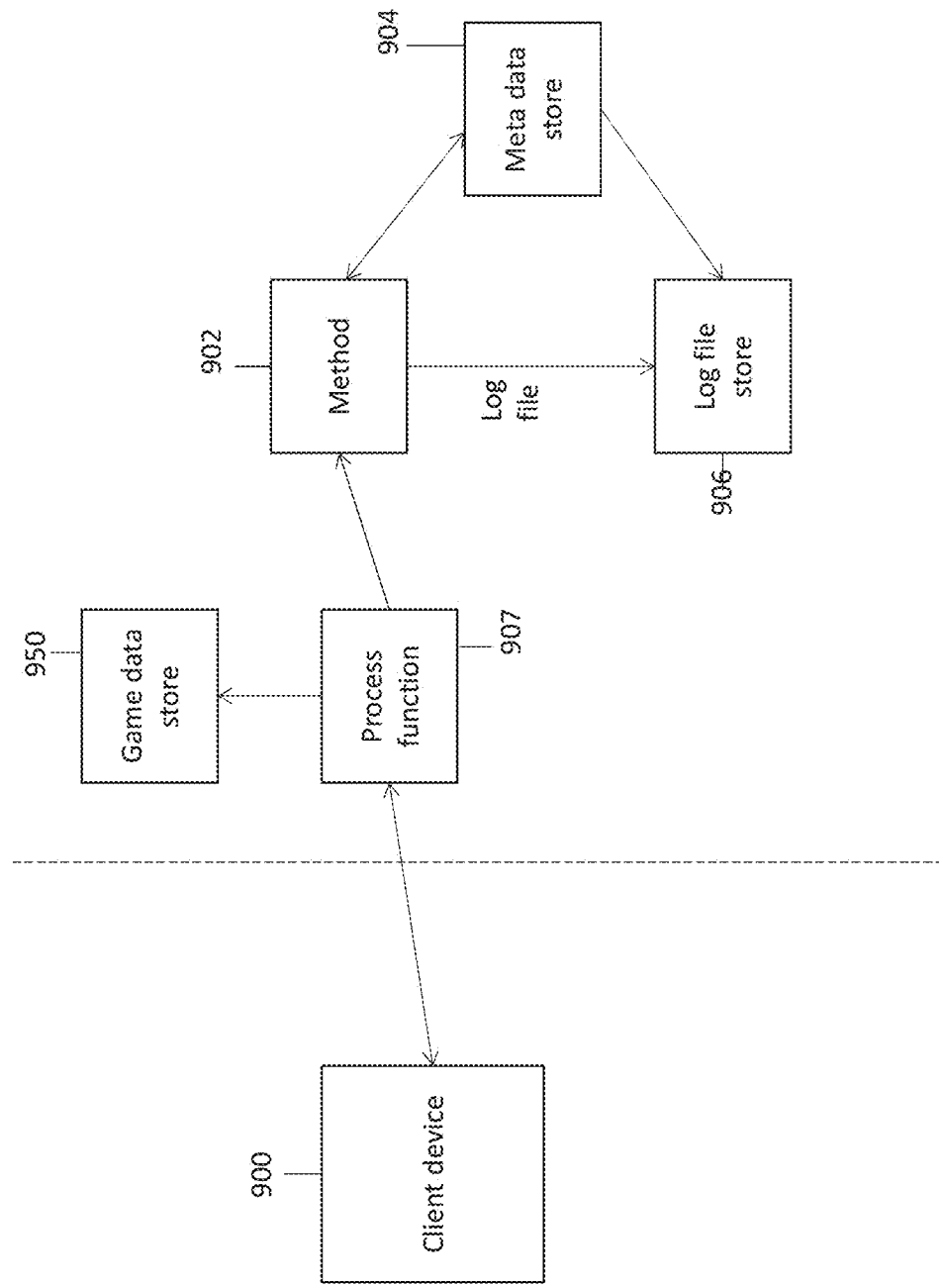
FIG. 10 schematically shows some of the functions provided by a server, according to some embodiments.

FIG. 10 is schematic and shows some of the functions provided on the server side. The physical entities which provide these functions may be any one or more suitable entities. The client device 900 (which may be as discussed in relation to FIG. 3) will allow the user to play the game. The client device will determine when a particular game event occurs and cause the client device to make a call to the method 902 which is on the server side. A process function 907 which may be provided by a server or the like will receive the call. The call is then directed to the method 902 by the process function. The method 902 may be on the same server as the process function or a different server to the process function. The server side also has the game data store 950 which stores a user's data, such as progress data or the like. Data for the game data store 950 may be received by the process function and directed to the game data store. In response to the invoking of the method 902, a log file is generated and is stored in a log file store 906. Any suitable data store 906 may be used to store the log file data 906, which may be the form of text files, as discussed above.

Meta data may provide a key to the data stored in the log files in the log file store. This will define for each of the game event identifiers, the format of the information stored in the log file. A separate store 904 can be provided for this metadata. This metadata store 904 can be used to determine how to parse the stored log files and allows new queries to be formulated easily. Analytics for the data can be determined by using the information in the metadata store to form queries which can then be used to parse the data store which has the text data files.

It should be appreciated that the data in the log file may be provided by the client device. This data may be some of the data to be stored in the game data store and/or may be provided specifically for the log file. The server side may provide data such as for example time stamp information or the like.

It should be appreciated that embodiments may be used with any suitable game event. The game event may be the completion of a level, the start of a game, the ending of a game, purchasing of a particular item, interaction with one or more friend, a particular score or the like.

Figure 11:
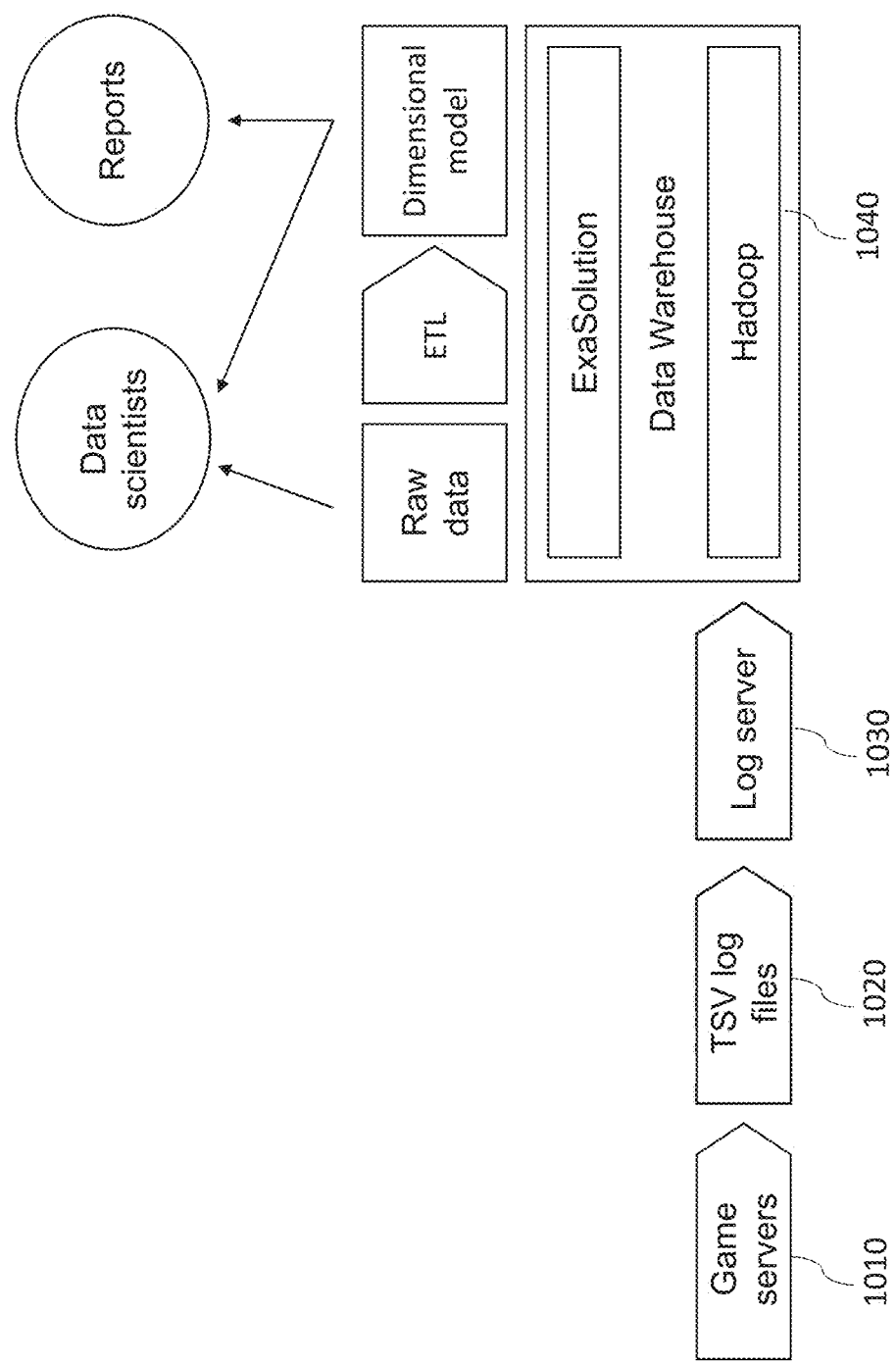
FIG. 11 shows a data pipeline according to some embodiments.

FIG. 11 shows a data pipeline. The data pipeline may be used with the system of FIG. 10 and/or in any other suitable scenario. The pipeline comprises game servers 1010, TSV (tab separated value) log files 1020, a log server 1030 and a data warehouse 1040. At the data warehouse, data is processed from raw data (which may be provided directly to data scientists) to a dimensional model which may be used to provide reports (or provided directly to data scientists). An extract, transfer, load ETL process may be used to transform the raw data to the dimensional model. Reports may be provided from the raw data and/or the dimensional model.

Figure 12:
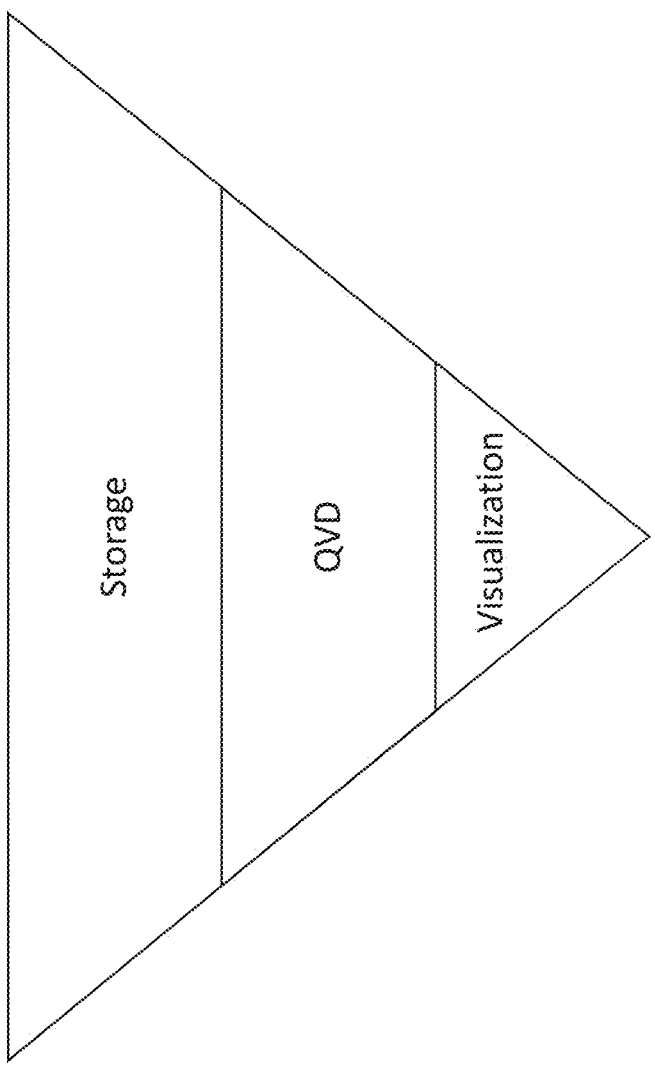
FIG. 12 shows the architecture of a reporting tool according to some embodiments.

FIG. 12 shows the architecture of a reporting tool in which data is directly imported from servers, e.g. MySQL (my sequel) or any other relational database management system servers, and all processing performed at the next level of the architecture, in this example QlikView (QV), before being provided to a visualisation layer. Other processing systems other than QV may alternatively or additionally be used. Such architecture may be suitable when dimensions are on a per user level. As more data are produced, for examples as games grow in popularity or the number of games increases, all reporting may be transitioned towards a per group (dimension) level. More and more processing may be pushed upstream. Architecture such as that of FIG. 11 may no longer be suitable.

Figure 13:
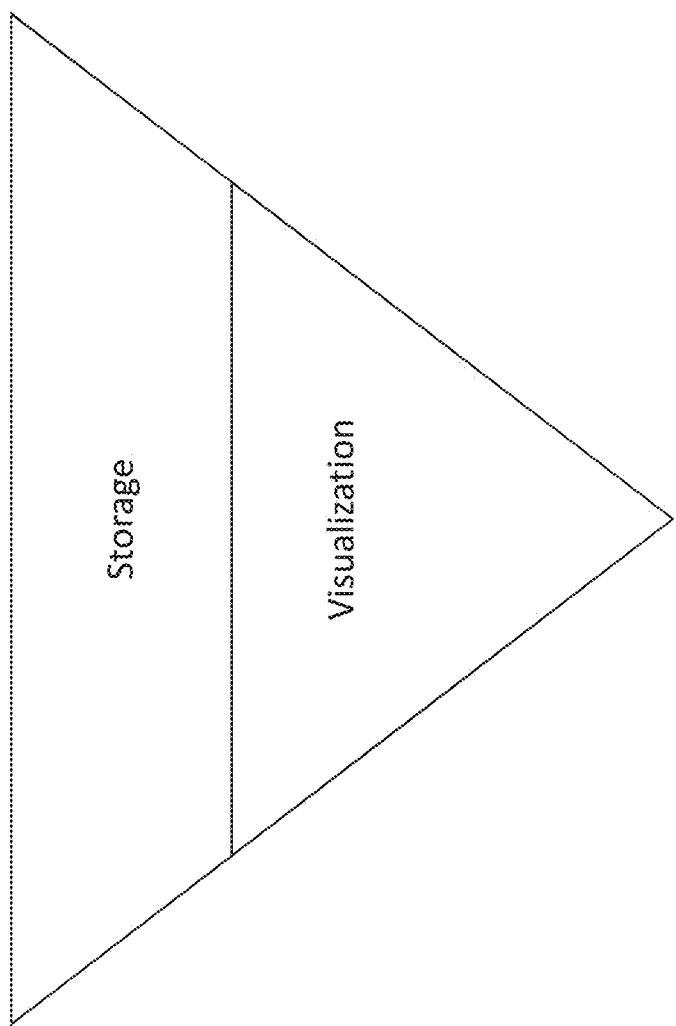
FIG. 13 shows the architecture of a reporting tool according to another embodiment.

An arrangement shown in FIG. 13 has a storage layer and a visualization layer. The visualization layer has to be much thicker (i.e. requires more processing) as compared to the scenario of FIG. 12.

With the improvement of the tracking and an increase in the number of games, there is a challenge of output to balance.

Figure 14:
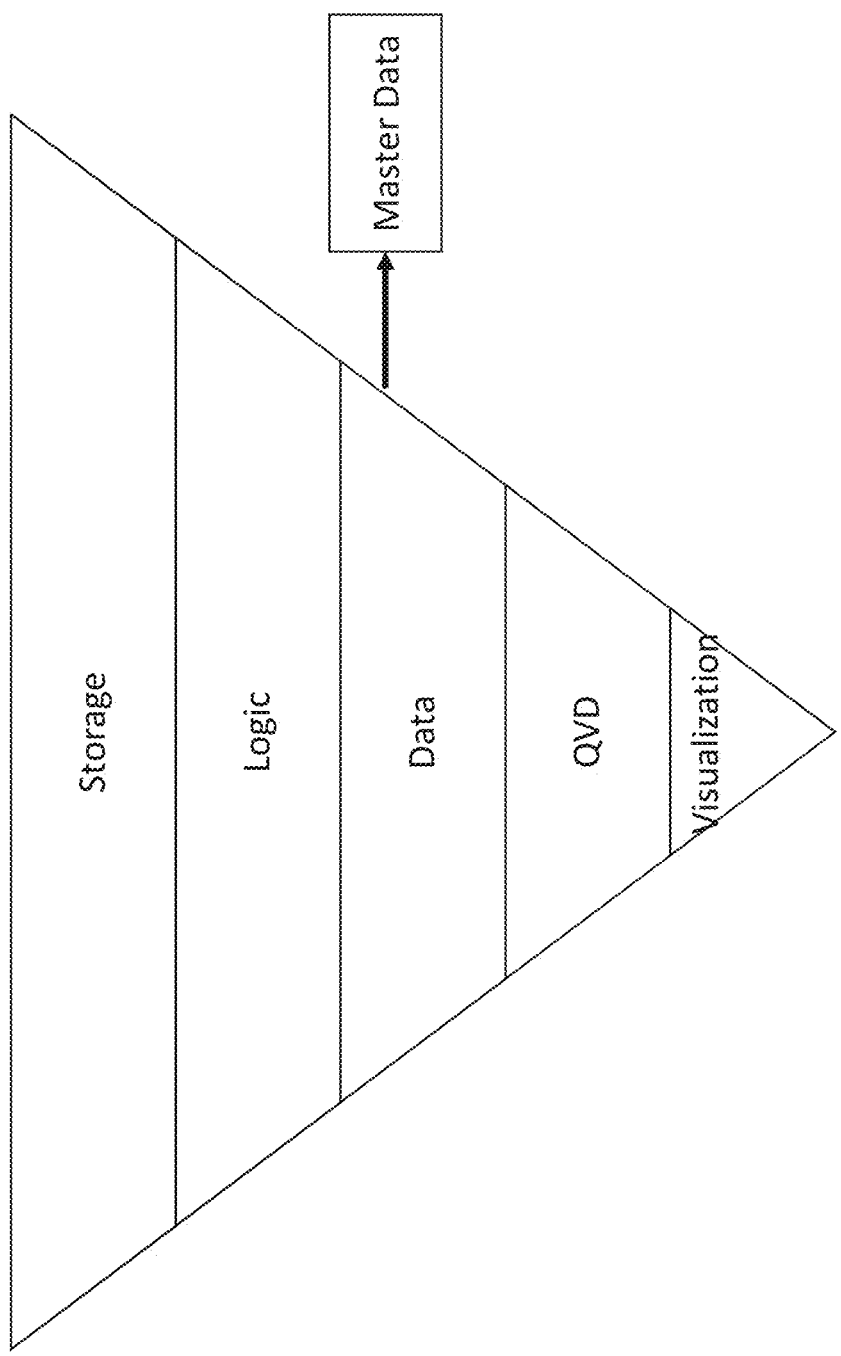
FIG. 14 shows the architecture of a reporting tool according to another embodiment.

An alternative solution is to apply all logic (and cleaning) as close to the source of the data as possible. FIG. 14 shows architecture of a reporting tool in accordance with some embodiments.

The reporting tool comprises a storage layer (for example, Hadoop cluster). Hadoop is an example of a computational cluster and in other embodiments, any other suitable computational cluster may be used. The storage layer is optimized for storage, not for speed—data can be dumped in this layer.

The architecture comprises a logic layer (for example, Exasol/Hive), the set of logic rules is provided as close to the storage as possible. Problems with data may be fixed at source. The architecture comprises a data layer (for example, Exasol/Hive). The cleaned data may be categorized into data types. This may make it easier to find data when searching.

The architecture may comprise a master data layer (e.g., Exasol/Hive) Master data dimensions are easily accessible and ready to be connected to ids in fact tables.

The logic layer produces a data layer, when pre-calculated KPIs (key performance indicators) and/or cleaned data can be fetched. The data layer may be separated into different types of data so that there is no need to search through the whole data when looking for a specific field or table. A notable separation of data types may be the separation of master data.

Exasol is an example of a relation database system. In other embodiments, any other suitable type of relation database system may be used. Hive is provided to support Hadoop structures.

Figure 15:
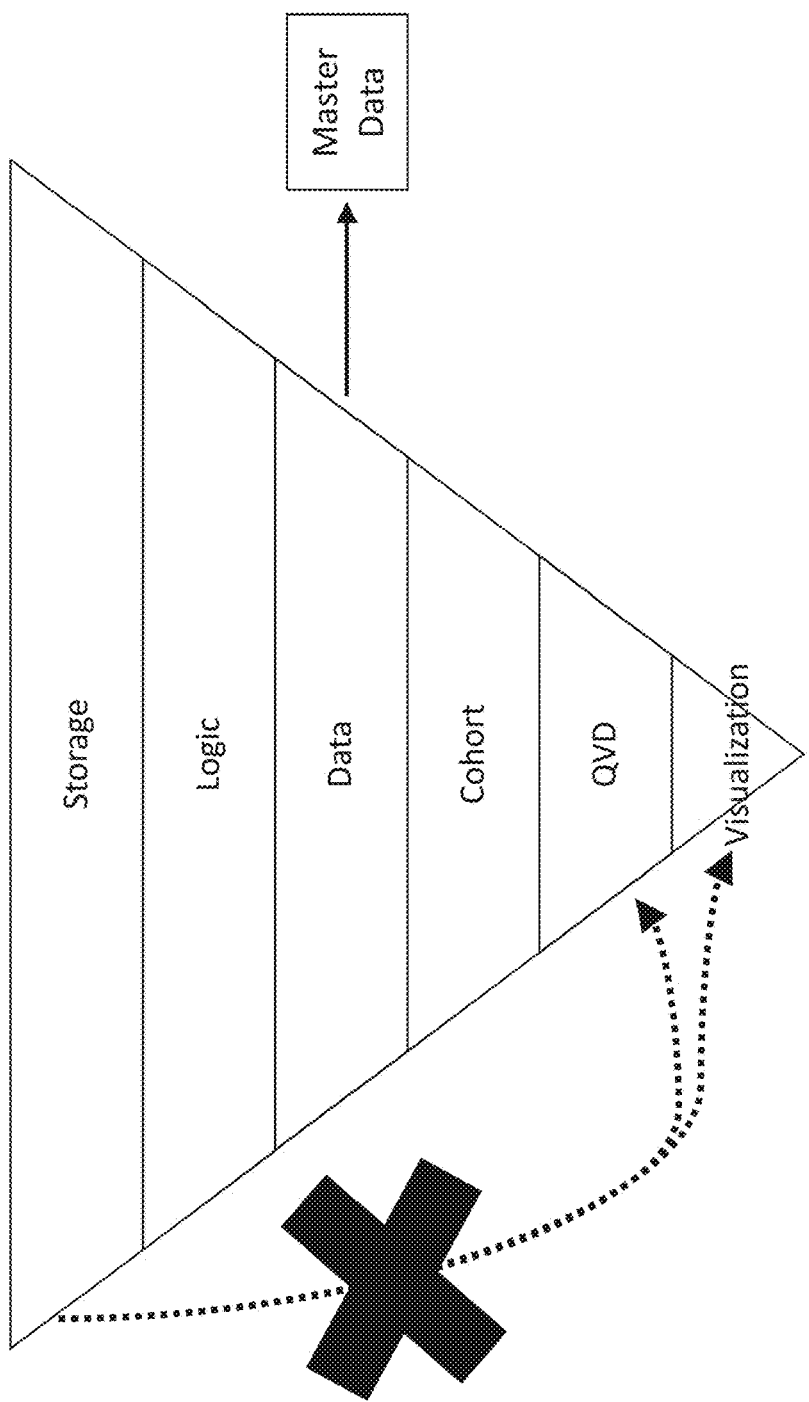
FIG. 15 shows the architecture of a reporting tool according to another embodiment.

As shown in FIG. 15, the architecture may comprise a cohort layer (e.g., Exasol datamart). The data in the cohort layer may be pre-aggregated and optimized for speed.

A QVD (QlikView data) layer (fileserver) is provided. The QVD layer may report a specific data layer. The QVD layer may be optimized for accessibility (and/or for storing optional data).

A visualization layer (Qlikview) is provided. The visualization layer is optimized for user experience.

Master data is a number of slowly changing dimensions that can be attributed to an ID, like ArticleName for articleID, or GameTitle for gameID. These are by way of example only and any other suitable ID (identity) may alternatively or additionally be used. The general idea is that master data can be applied to all values in the visualization layer, so there is no need to rerun an entire QVD layer because of an update of a field in the master data.

The aggregation of data from the data layer to the QVD layer may be a heavy duty for a daily process. As shown in FIG. 15, the architecture may comprise a layer, a cohort layer, for the most commonly used data. This layer may have a required minimum aggregation level (for example, daily).

This layer can pre-aggregate the most commonly used data from the data layer into what may be referred to as "cubes". These "cubes" may be fast to load from, but not very dynamic.

At the end of the data chain, QVD-loaders can load data from either the data layer (some cases) or the cohort layer (most cases) and store it on a dedicated fileserver.

It may not be desirable to fetch data directly from the storage layer as it may contain bad quality data, or even errors. In some embodiments, business logic may be provided in the QVD-loader which would negate providing all the logic in one place—the logic layer.

Finally these QVDs are loaded with an optimized load into the visualization layer. Thus in some embodiments, nothing is provided to the visualisation later without being used. In the visualization layer, if a field is not being used, it should not be kept. This helps keep the data environment maintainable. The field may be kept in the QVD layer or earlier up the chain if it may be needed in future.

Each layer may be provided with performance and maintainability in mind. The funnel of data from storage to visualization may provide only high quality data, delivered with dependability and speed. It may also avoid having to deal with one field with two different names in different reports.

The reason for this is that in addition to just adding layer upon layer of structure, each layer may be selected to do the function for which it designed. The surrounding framework may be built on top of those strengths.

Storage layer—Optimized for storage, not for speed. The data is dumped here.

Logic layer—Set of rules as close to the storage as possible. This allows problems to be fixed at source.

Data layer—Cleaned data categorized into data types. This makes it easier to find what is being looked for.

Master data layer—Master data dimensions easily accessible and ready to be connected to IDs in fact tables.

Cohort layer—Pre-aggregated data, optimized for speed.

QVD layer (fileserver)—Report specific data layer. Optimized for accessibility (also storing optional data).

Visualization layer—Optimized for user experience.

The game may for instance be played in an offline mode on a handheld device 200, 305 using locally stored information on the handheld device 200, 305. The device may store all or some of the levels that are available as applicable to the particular game and its saga or mission objectives. Some of the features may be locally executed on the device 200, 305. This may for instance implement a scheme to regenerate lives after a certain period of time, the time may be locally decided based on the clock on the device 200, 305. In some embodiments, the central game server 320 clock may override the local clock when the local device 200 has been synchronised with the server 320.

Some embodiments may be implemented to synchronize game state information 120, 150 and/or retrieve and connect to social graph information and user profile data on a social network 330 such as Facebook or Google+.

Some embodiments may be implemented to enable connection to a plurality of social networks 330. The user may be given the option to select which information may be derived and/or shared with which social network 330.

Various embodiments of methods and devices have been described in the foregoing. It should be appreciated that such may be implemented in apparatus, where the apparatus is implemented by any suitable circuitry. Some embodiments may be implemented by at least one memory and at least one processor. The memory may be provided by memory circuitry and the processor may be provided by processor circuitry. Some embodiments may be provided by a computer program running on the at least one processor. The computer program may comprise computer implemented instructions which are stored in the at least one memory and which may be run on the at least one processor.

It is also noted herein that there are several variations and modifications which may be made to the disclosed solution without departing from the scope of the present disclosure.

The invention claimed is:

1. A computer implemented method performed by a computer device configured to provide a computer game, the computer device comprising at least one memory, at least one processor, a user interface, and a display which are configured to perform the method of:

retrieving by the at least one processor, from the at least one memory of the device, information associated with a plurality of game objects and one or more characteristics of each of the plurality of game objects;

determining, by the at least one processor, a position for each of the plurality of game objects in dependence on the information;

displaying, by the display, in a first arrangement the plurality of game objects with the respective one or more characteristics on an area of the display in dependence on the determined position and in a group, wherein at least two of the plurality of game objects are adjacent to one another;

receiving user input via the user interface;

in response to the received user input received via the user interface, causing, by the at least one processor, a further game object to be shot towards the plurality of game objects such that the further game object is added to the plurality of game objects in the group;

determining, by the at least one processor, a position for the further game object and an updated position for the plurality of game objects, wherein as the further game object is added, a relative position of the at least two of the plurality of game objects is changed by the adding of the further game object, the at least two game objects remaining part of said group and being no longer adjacent one another;

causing, by the at least one processor, the display to display an updated arrangement of game objects with the further game object and the plurality of game objects with the respective one or more characteristics on the area of the display in the group and in dependence on the determined position for the further game object and the updated position for the plurality of game objects; and determining, by the at least one processor after causing the updated arrangement to be displayed, if the addition of the further game object causes a matching condition between the further game object and associated game objects to be satisfied, and if so, removing the game objects satisfying the matching condition from the display area.

2. The computer implemented method of claim 1, wherein the user input is configured to control the position for the further game object added to the plurality of game objects.

3. The computer implemented method of claim 1, wherein the user input is configured to cause the further game object to be propelled into the plurality of game objects.

4. The computer implemented method of claim 1, comprising determining, by the at least one processor, an association between the two or more of the plurality of game objects, wherein the association comprises a constraint which limits a distance between the two or more game objects having the respective association to up to a threshold distance.

5. The computer implemented method as claimed in claim 4, wherein a respective association is removed when the adding of the further game object causes a distance between the two or more of the plurality of game objects to be greater than the threshold distance.

6. The computer implemented method according to claim 4, comprising determining, by the at least one processor, positions of the two or more of the plurality of game objects in dependence on a weight of the constraint.

7. The computer implemented method according to claim 6, wherein said weight is dependent on a number of game objects having a respective association with a respective game object.

8. The computer implemented method of claim 1, wherein the position for the further game object and the determined updated position for the plurality of game objects is determined in dependence on an imposed movement of the plurality of game objects generated by the at least one processor.

9. The computer implemented method according to claim 8, wherein the imposed movement is a wave motion.

10. The computer implemented method as claimed in claim 8, wherein the imposed movement includes a gravity component.

11. The computer implemented method according to claim 1, wherein the matching condition is satisfied when at least three game objects share a common characteristic.

12. The computer implemented method as according to claim 1, comprising determining, by the at least one processor, that adding of the further game object causes an association between two or more of the plurality of game objects to be added such that the respective two or more of the plurality of game objects for which the respective association has been added have up to a threshold distance therebetween.

13. The computer implemented method as claimed in claim 1, wherein said updated position for the plurality of game objects is determined in dependence on a movement associated with said further game object.

14. The computer implemented method according to claim 1, wherein the further game object is a projectile and said user input causes said further game object to be shot into said plurality of game objects.

15. The computer implemented method according to claim 1, wherein said method comprises displaying, on the display, at least two of said plurality of game objects having an increased distance therebetween in response to the adding of said further game object to said plurality of game objects in said group.

16. The computer implemented method according to claim 1, comprising iteratively updating, by the at least one processor, the position of one or more of said plurality of game objects as said further game object moves with respect to said plurality of game objects in said group.

17. A computer device configured to provide a computer game, the computer device comprising at least one processor and at least one memory, a display, a user interface and computer code stored in the memory, wherein:
   the at least one processor is configured to retrieve, from at least one memory of the apparatus, information associated with a plurality of game objects and one or more characteristics of each of the plurality of game objects;
   the at least one processor is configured to determine a position for each of the plurality of game objects in dependence on the information;
   the display is configured to display in a first arrangement the plurality of game objects with the respective one or more characteristics on an area of the display in dependence on the determined position and in a group, wherein at least two of the plurality of game objects are adjacent to one another;
   the user interface is configured to receive user input;
   the at least one processor is configured to, responsive to the user input received via the user interface, cause the display to display a further game object to be shot towards the plurality of game objects such that the further game object is added to the plurality of game objects;
   the at least one processor is configured to determine a position for the further game object and an updated position for the plurality of game objects, wherein as the further game object is added, a relative position of the at least two of the plurality of game objects is changed by the adding of the further game object, the at least two game objects remaining part of said group and being no longer adjacent one another;
   the at least one processor is configured to cause the display to display an updated arrangement of game objects with the further game object and the plurality of game objects with the respective one or more characteristics on the area of the display in the group and in dependence on the determined position for the further game object and the updated position for the plurality of game objects; and
   the at least one processor is configured to determine, after causing the updated arrangement to be displayed, if the addition of the further game object causes a matching condition between the further game object and associated game objects to be satisfied, and if so, remove the game objects satisfying the matching condition from the display area.

18. The computer device of claim 17, wherein the at least one processor and at least one memory are configured such that said user input controls the position of the further game object added to the plurality of game objects.

19. The computer device of claim 17, wherein the at least one processor and at least one memory are configured such that the user input is configured to cause the further game object to be propelled into the plurality of game objects.

20. The computer device claim 17, wherein the at least one processor is configured to determine an association between the two or more of the plurality of game objects, wherein the association comprises a constraint which limits a distance between two or more game objects having the respective association to up to a threshold distance.

21. The computer device as claimed in claim 20, wherein the at least one processor and at least one memory are configured such that a respective association is removed when the adding of the further game object causes a distance between the two or more of the plurality of game objects to be greater than the threshold distance.

22. The computer device according to claim 20, wherein the at least one processor and at least one memory are configured to determine positions of the two or more of the plurality of game objects in dependence on a weight of the constraint.

23. The computer device according to claim 22, wherein said weight is dependent on a number of game objects having a respective association with a respective game object.

24. The computer device of claim 17, wherein the at least one processor and at least one memory are configured such that the position for the further game object and the determined updated position for the plurality of game objects is determined in dependence on an imposed movement of the plurality of game objects generated by the at least one processor.

25. The computer device according to claim 24, wherein the imposed movement is a wave motion.

26. The computer device as claimed in claim 24, wherein the imposed movement includes a gravity component.

27. The computer device according to claim 17, wherein the at least one processor and at least one memory are configured to determine if a matching condition is satisfied if at least three game objects share a common characteristic.

28. The computer device as according to claim 17, wherein the at least one processor and at least one memory are configured such that adding of the further game object causes an association between two or more of the plurality of game objects to be added such that the respective two or more of the plurality of game objects for which the respective association has been added have up to a threshold distance therebetween.

29. The computer device as according to claim 17, wherein said adding of said further game object causes a change in the arrangement of the plurality of game objects.

30. The computer device as according to claim 17, wherein said updated position for the plurality of game objects is determined by said at least one processor in dependence on a movement associated with said further game object.

31. A non-transitory computer readable medium encoded with instructions which, when executed by at least one processor of a computer device cause the computer device to be configured to provide a computer game, said computer device comprising at least one memory, at least one processor, a user interface, and a display, said instructions when executed by the at least one processor configure the computer device to implement a said method comprising:

retrieving, by the at least one processor, from the at least one memory of the device, information associated with a plurality of game objects and one or more characteristics of each of the plurality of game objects;

determining, by the at least one processor, a position for each of the plurality of game objects in dependence on the information;

displaying, by the display in a first arrangement, the plurality of game objects with the respective one or more characteristics on an area of the display in dependence on the determined position and in a group, wherein at least two of the plurality of game objects are adjacent to one another;

receiving user input via the user interface;

in response to the received user input received via the user interface, causing, by the at least one processor, a further game object to be shot towards the plurality of game objects such that the further game object is added to the plurality of game objects in the group;

determining, by the at least one processor, a position for the further game object and an updated position for the plurality of game objects, wherein as the further game object is added, causes a relative position of the at least two of the plurality of game objects is changed by the adding of the further game object, the at least two game objects while remaining part of said group and being no longer adjacent one another; and causing, by the at least one processor, the display to display an updated arrangement of game objects with the further game object and the plurality of game objects with the respective one or more characteristics on the area of the display in the group and in dependence on the determined position for the further game object and the updated position for the plurality of game objects; and determining, by the at least one processor after causing the updated arrangement to be displayed, if the addition of the further game object causes a matching condition between the further game object and associated game objects to be satisfied, and if so, removing the game objects satisfying the matching condition from the display area.

* * * * *